(12) United States Patent
Wang et al.

(10) Patent No.: US 9,230,067 B2
(45) Date of Patent: Jan. 5, 2016

(54) METHOD FOR NORMALIZING A COMPUTER SYSTEM

(75) Inventors: Jiaxiang Wang, Beijing (CN); Lidong Qu, Beijing (CN)

(73) Assignee: ANTAIOS (BEIJING) INFORMATION TECHNOLOGY CO., LTD., Beijing (CN)

( * ) Notice: Subject to any disclaimer, the term of this patent is extended or adjusted under 35 U.S.C. 154(b) by 77 days.

(21) Appl. No.: 13/881,176

(22) PCT Filed: Dec. 21, 2010

(86) PCT No.: PCT/CN2010/080034
§ 371 (c)(1),
(2), (4) Date: Apr. 24, 2013

(87) PCT Pub. No.: WO2012/083521
PCT Pub. Date: Jun. 28, 2012

(65) Prior Publication Data
US 2013/0219464 A1    Aug. 22, 2013

(51) Int. Cl.
*G06F 17/00* (2006.01)
*H04L 29/06* (2006.01)
*G06F 21/00* (2013.01)

(52) U.S. Cl.
CPC ...................................... *G06F 21/00* (2013.01)

(58) Field of Classification Search
CPC ....... G06F 21/00; G06F 21/51; G06F 21/562; G06F 21/563
USPC ............................................................ 726/1
See application file for complete search history.

(56) References Cited

U.S. PATENT DOCUMENTS 7,546,587 B2 *  6/2009  Marr et al. .................... 717/127
7,950,056 B1 *  5/2011  Satish et al. ................... 726/22

(Continued)

FOREIGN PATENT DOCUMENTS

| CN | 02809740.8 | 6/2004 |
|---|---|---|
| CN | 200810037824.0 | 10/2008 |
| CN | 101872400 | 10/2010 |

(Continued)

OTHER PUBLICATIONS

PCT Appln. Serial No. PCT/CN2010/080034, International Search Report, mailed Oct. 13, 2011, 3 pages—English, 3 pages—Chinese.

(Continued)

*Primary Examiner* — Dant Shaifer Harriman
(74) *Attorney, Agent, or Firm* — Andrew F. Young, Esq.; Lackenbach Siegel, LLP (57) ABSTRACT

A method for standardizing computer system action, including: intercepting invoking command; obtaining data structure of the intercepted invoking command after intercepting the invoking command; determining the sponsor of the intercepted invoking command based on the data structure of the obtained and intercepted invoking command, and determining operation method and operation object of the intercepted invoking command; matching the sponsor, the operation method and the operation object of the intercepted invoking command with rules of standardizing computer system action, judging whether to allow executing the intercepted invoking command. The present disclosure determines the sponsor of the intercepted invoking command according to the data structure of the invoking command, and can monitor comprehensively computer system. If only the sponsor is spiteful, the disclosure does not all allow executing the intercepted invoking command, thus detecting lawless operation comprehensively and effectively.

10 Claims, 4 Drawing Sheets

(56) References Cited

U.S. PATENT DOCUMENTS

| | | | |
|---|---|---|---|
| 8,156,536 B2* | 4/2012 | Polk | 726/1 |
| 8,468,113 B2* | 6/2013 | Harrison et al. | 706/47 |
| 2006/0161966 A1* | 7/2006 | Nagampalli et al. | 726/1 |
| 2006/0259763 A1* | 11/2006 | Cooperstein et al. | 713/166 |
| 2006/0259947 A1* | 11/2006 | Aarnos et al. | 726/1 |
| 2009/0210888 A1 | 8/2009 | Lee et al. | |

FOREIGN PATENT DOCUMENTS

| | | |
|---|---|---|
| JP | 2006330864 | 12/2006 |
| JP | 2008021274 | 1/2008 |
| JP | 2010211257 | 9/2010 |
| WO | WO 2010/001766 | 1/2010 |
| WO | WO 2011/041871 | 4/2011 |

OTHER PUBLICATIONS

PCT Appln. Serial No. PCT/CN2010/080034, Written Opinion mailed Sep. 20, 2011, 2 pages—English, 4 pages—Chinese.

Japanese Patent Appln. No. 2013-538027 mailed Apr. 22, 2014, 2 pages—English; 2 pages—Japanese.

* cited by examiner

METHOD FOR NORMALIZING A COMPUTER SYSTEM

CROSS REFERENCE TO RELATED APPLICATIONS

This application relates to and claims priority from International Application Ser. No. PCT/CN2010/080034 filed Dec. 21, 2010, the entire contents of which is incorporated herein by reference.

FIELD OF THE DISCLOSURE

The present disclosure relates to the field of computer, and in particular to a method for normalizing behavior of a computer system.

BACKGROUND OF THE DISCLOSURE

The existing computer security techniques mainly include: 1. the computer security system based on "scanning and killing" mechanism, for example software such as anti-virus software or firewall; 2. the computer security system based on "shielding" mechanism, for example security systems such as "time machine" or "sandbox"; and 3. the computer security system based on "system reinforcing" theory, such as "secure operation system (referred to as secure OS for short)".

The above-mentioned "scanning and killing" and "shielding" mechanisms can not ensure the security of the computer system theoretically. And the "system reinforcing" mechanism is practically to restrict the behavior of the computer to ensure the computer operation security, products based on this mechanism mainly include secure operation system and other active defense-type products; however, this type of products can provide security control for the system only by independently restricting some behaviors of the computer, thus the application of the computer is greatly restricted.

Practically, due to the complexity in computer structure, computer behavior and computer status variation, a certain behavior of the computer may only cause a certain status variation of the computer, or may result in a series of reactions of the computer and lead to a series of status variations, therefore, the security of the computer system cannot be effectively ensured by determining the legitimacy of the computer behavior only according to the present computer behavior. This is why the active defense-type software can only be used as an auxiliary security system.

Further, due to the complexity in the computer operation, a certain specific behavior of the computer may be caused by a certain permissible program and may also be caused by malicious code. If the legitimacy of a certain specific behavior is determined only by a certain specific behavior itself, the "one-size-fits-all" phenomenon is caused, so that the permissible behavior and the impermissible behavior that is caused by the malicious code will be processed in the same way, thus the security purpose of effectively distinguishing the "good" and the "malicious" can not be achieved.

The security of the computer must be systematic, and solving a local problem can not ensure the security of the computer system. For example, when the static text code is ensured not to be modified, if the memory code or parameter is maliciously modified, then the security of the computer system can not be ensured. Any operation of the computer during the running process is the function owned by the computer, each operation of the computer is neither "good" nor "malicious" independently; for example, deleting file, modifying memory and instruction recombination can not be determined as "good" or "malicious" independently.

Therefore, the computer system security mainly faces two problems presently. The first problem is to acquire the basis for determining the legitimacy of the computer behavior: specifically, in determining the legitimacy of the behavior of the computer system, no effective "evidence chain" can be formed as the determining condition, thus the basic problem for the security of the computer system is to establish a "continuous" and "effective" determining mechanism. The second problem is how to effectively distinguish the "good" behavior from the "malicious" behavior: in the running process of the computer system, the behavior itself is neither "good" nor "malicious", a certain behavior becomes an malicious behavior only if it is maliciously used, thus the most crucial problem for the running security of the computer system is the way to distinguish the "good" behavior from the "malicious" behavior.

SUMMARY OF THE DISCLOSURE

The present disclosure provides a method for normalizing behavior of a computer system, for realizing the overall and continuous monitoring on the behavior and status of the running of the computer system, so as to realize the overall and continuous control on the behavior of the computer system, and thus achieve the purpose of ensuring the security of the behavior of the computer system. The disadvantages in the existing information security technique that the computer behavior can not be monitored completely and the behavior of the computer system can not be controlled are overcome.

To solve the above problems, a method for normalizing behavior of a computer system is provided in one embodiment of the present disclosure provides. According to the embodiment, the method includes:

obtaining a calling instruction, obtaining information of a code segment to be called by the calling instruction based on the calling instruction, and establishing a code segment calling data structure, wherein the code segment calling data structure is established by taking a code segment in which the calling instruction is located as a node and taking a calling relation that is established by the calling instruction between a code segment initiating the calling instruction and the code segment to be called as a calling path, and the code segment calling data structure includes several sub-data structures;

obtaining a sub-data structure associated with a current operation request from the data structure; and determining an initiator, an operation method and an operation object of the current operation request based on the sub-data structure, with the current operation request being an action of a current calling instruction; and obtaining a rule for normalizing behavior of the computer system, comparing the determined initiator, the determined operation method and the determined operation object of the current operation request with the rule, and determining whether the current operation request is permissible.

Optionally, the rule for normalizing behavior of the computer system includes three elements which are: an initiator of the operation request, an operation method of the operation request and an operation object of the operation request;

The rule is that: if the determined initiator satisfies the requirement of the rule, the current operation request is permitted to be performed; alternatively, if the determined initiator and the determined operation method satisfy the requirement of the rule, the current operation request is permitted to be performed; alternatively, if the determined initiator and the determined operation object satisfy the requirement of the rule, the current operation request is permitted to be performed; alternatively, if the determined initiator, the determined operation method and the determined operation object satisfy the requirement of the rule, the current operation request is permitted to be performed.

Optionally, the initiator is a sub-data structure that is composed of all the nodes and calling paths that are prior to the current operation request and associated with the current operation request.

Optionally, the operation object is content to be operated by the code segment to be called for the current operation request.

Optionally, the operation method is an operation to be performed by the code segment to be called for the current operation request.

Optionally, the obtaining a sub-data structure associated with a current operation request from the data structure includes: presetting a condition for obtaining the sub-data structure; and if the current operation request satisfies the preset condition, based on the data structure, backtracking the node and the calling path associated with the current operation request, and obtaining the sub-data structure associated with the current operation request.

Optionally, the method further includes:

dividing computer running space into at least two sub-spaces;

the preset condition for obtaining a sub-data structure is that an operation request in a one sub-space is to operate on an object in another sub-space.

Optionally, the establishing the data structure includes:

obtaining the calling instruction;

obtaining the code segment initiating the calling instruction and the code segment to be called;

establishing a calling node and a called node by using respectively the obtained code segment initiating the calling instruction and the obtained code segment to be called; and establishing the calling relation between the code segment initiating the calling instruction and the code segment to be called, and taking the established calling relation as the calling path between the calling node and the called node.

Optionally, the calling instruction is an assembler instruction, and the obtaining the calling instruction includes:

performing binary translation on a computer code that is running to obtain the calling instruction.

Optionally, the obtaining the code segment initiating the calling instruction and the code segment to be called includes:

obtaining an address of the code segment to be called from a calling parameter; and obtaining the code segment to be called based on the address of the code segment to be called, with the code segment in which the calling instruction is located being the code segment initiating the calling instruction, As compared with the prior art, the present disclosure has the following advantages.

With the technical solution of the present disclosure, the sub-data structure associated with the current operation request is obtained from the established code segment calling data structure, the initiator, operation method and operation object of the current operation request are determined based on the sub-data structure; it is determined whether the current operation request is permitted to be performed according to the result of the comparing between the initiator, operation method and operation object that are determined by the sub-data structure and the rule. With the above solution, the current operation request can be analyzed before the current operation request is performed, the analyzing on the hazard of the current operation is not dependent on the action result as compared with the prior art, and the defense can be made before the hazard occurs; moreover, the dynamic and continuous sub-data structure that is associated with the current operation request is used to describe the current operation request, unlike the independently analyzing on each current operation in the prior art. Thus, by associating the current operation request and the behavior that is prior to and associated with the current operation request, it can be effectively determined whether the current operation request is "good" or "malicious". Thereby, the disadvantage in the prior that the behavior of the computer system can only be monitored and analyzed after the event is solved, and the disadvantage in the prior that the operation behavior can not be "determined" to determine whether the current operation request is "good" or "malicious" is solved.

Further, in the specific embodiments of the present disclosure, the rule for normalizing behavior of a computer system can be that if the initiator of the operation request satisfies the requirement of the rule, the current operation request is permitted to be performed; alternatively, if the initiator and operation method of the operation request satisfy the requirement of the rule, the current operation request is permitted to be performed; alternatively, if the initiator and operation object of the operation request satisfy the requirement of the rule, the current operation request is permitted to be performed; alternatively, if the initiator, operation method and operation object of the operation request satisfy the requirement of the rule, the current operation request is permitted to be performed. The rule for normalizing behavior of a computer system can be determined according to the practical situation, which is very flexible.

DETAILED DESCRIPTION OF THE DISCLOSURE

Figure 1:
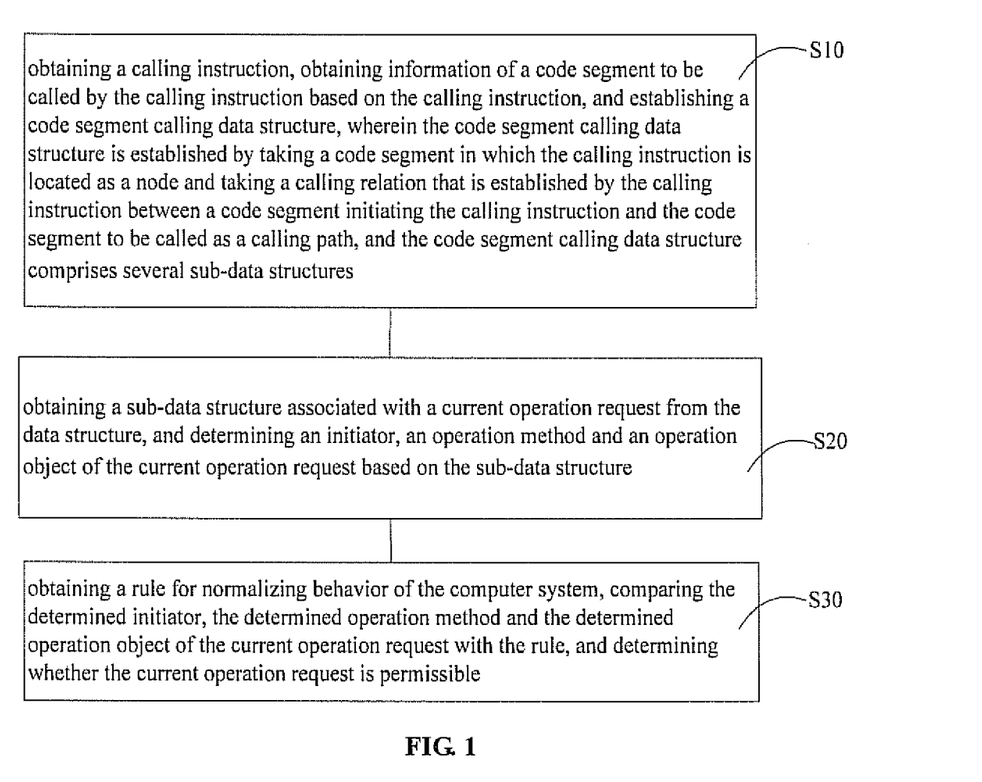
FIG. 1 is a flow chart of a method for normalizing behavior of a computer system according to a specific embodiment of the present disclosure.

Within a specific embodiment of the present disclosure, the sub-data structure associated with the current operation request is obtained from the data structure, and the initiator, operation method and operation object of the current operation request are determined based on the sub-data structure; whether the current operation request is permitted to be performed is determined according to the result of comparison between the initiator, operation method and operation object that are determined by the sub-data structure and the rule. With the above solution, the current operation request can be analyzed before the current operation request is performed, hazard analysis of the current operation does not depend on action results as compared with the prior art, and defense can be made before the hazard occurs; moreover, the dynamic and continuous sub-data structure that is associated with the current operation request is used to describe the current operation request, unlike isolated analysis on each current operation in the prior art. Thus, by associating the current operation request and the behavior that is prior to and associated with the current operation request, the reason that triggers the current operation request can be determined, and whether the current operation request is "good" or "malicious" can be determined by checking if the associated relation triggering the current operation request is "good" or "malicious". Thereby, the disadvantage in the prior art that the behavior of the computer system can only be monitored and analyzed after the event is solved, and the disadvantage in the prior art that the operation behavior can not be "recognized" to determine whether the current operation request is "good" or "malicious" is solved, FIG. 1 is a flow chart of a method for normalizing behavior of a computer system according to a specific embodiment of the present disclosure. Referring to FIG. 1, the method for normalizing behavior of a computer system according to a specific embodiment of the present disclosure includes the following steps.

Step S10, obtaining a calling instruction, obtaining information of a code segment to be called by the calling instruction based on the calling instruction, and establishing a code segment calling data structure; wherein the code segment calling data structure is established by taking a code segment in which the calling instruction is located as a node and taking a calling relation that is established by the calling instruction between a code segment initiating the calling instruction and a code segment to be called as a calling path; the code segment calling data structure includes several sub-data structures;

Step S20, obtaining a sub-data structure associated with a current operation request from the data structure; and determining an initiator, an operation method and an operation object of the current operation request based on the sub-data structure, with the current operation request being an action of the current calling instruction; and Step S30, obtaining a rule for normalizing behavior of the computer system, comparing the determined initiator, the determined operation method and the determined operation object of the current operation request with the rule, and determining whether the current operation request is permissible or legitimate.

The method for normalizing behavior of a computer system according to the specific embodiment of the present disclosure will be described in detail in connection with the specific embodiment and the drawings hereinafter, so that those skilled in the art will understand the spirit of the present disclosure better.

In step S10, a calling instruction is obtained, information of a code segment to be called by the calling instruction is obtained based on the calling instruction, and a code segment calling data structure is established; wherein the code segment calling data structure is established by taking the code segment in which the calling instruction is located as a node and taking a calling relation that is established by the calling instruction between the code segment initiating the calling instruction and the code segment to be called as a calling path; the code segment calling data structure includes several sub-data structures.

The computer achieves a certain function by executing codes and performing callings between functions, with a segment of code that is performed sequentially being defined as a code segment, and after a code segment is performed sequentially, it jumps to a next code segment through a calling instruction. Based on this principle, the data structure for describing the running process of the computer code, i.e. the code segment calling data structure in the present disclosure, is established.

When the computer is in operation, the code segment calling data structure is established by taking the code segment in which the calling instruction is located as a node and taking a calling relation that is established by the calling instruction between the code segment initiating the calling instruction and the code segment to be called as a calling path; the code segment calling data structure includes respective nodes and the calling paths between respective calling nodes and called nodes. The calling node refers to the node that is established by using the code segment that initiates the calling instruction, the called node refers to the node that is established by using the code segment to be called by the calling instruction (i.e., the called code segment), that is to say, in the establishment of two adjacent nodes in sequence, the calling node refers to the node that is established firstly, and the called node refers to the node that is established later. The code segment calling data structure in the present disclosure includes several sub-data structures; since several calling instructions can be performed meanwhile at the same time, the several calling instructions call several corresponding next code segments, thus the established code segment calling data structure is a data net which is composed of several sub-data structures.

Figure 2:
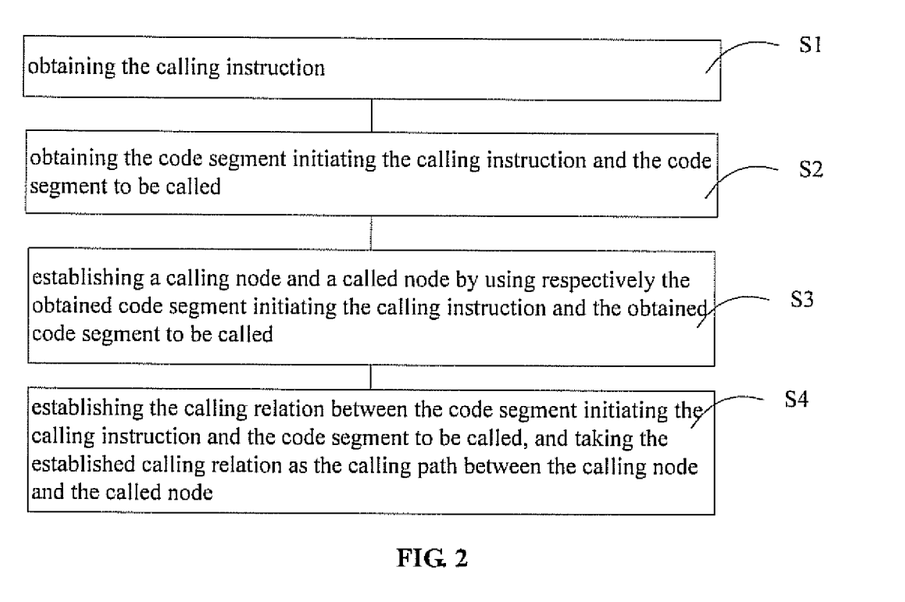
FIG. 2 is a flow chart of a method for establishing code segment calling data structure.

FIG. 2 is a flow chart of a method for establishing a code segment calling data structure. Referring to FIG. 2, the method for establishing a code segment calling data structure includes the following steps.

Step S21, obtaining the calling instruction;

Step S22, obtaining the code segment initiating the calling instruction and the called code segment;

Step S23, establishing a calling node and a called node by using respectively the obtained code segment initiating the calling instruction and the obtained called code segment; and Step S24, establishing the calling relation between the code segment initiating the calling instruction and the called code segment, and taking the established calling relation as the calling path between the calling node and the called node.

The method for establishing a code segment calling data structure will be described in detail. In step S21, a calling instruction is obtained: in this specific embodiment of the present disclosure, the calling instruction is an assembler instruction, and the codes running on the computer are all machine codes; in the specific embodiment of the present disclosure, the obtaining a calling instruction includes: performing binary translation on the machine code running on the computer to obtain the calling instruction. Specifically, by performing binary translation on the machine code that is running on the computer, the machine code is translated into the assembler language, this process is the disassembling process, and after the assembler code is obtained, the calling instruction in the assembler code is obtained.

Figure 3:
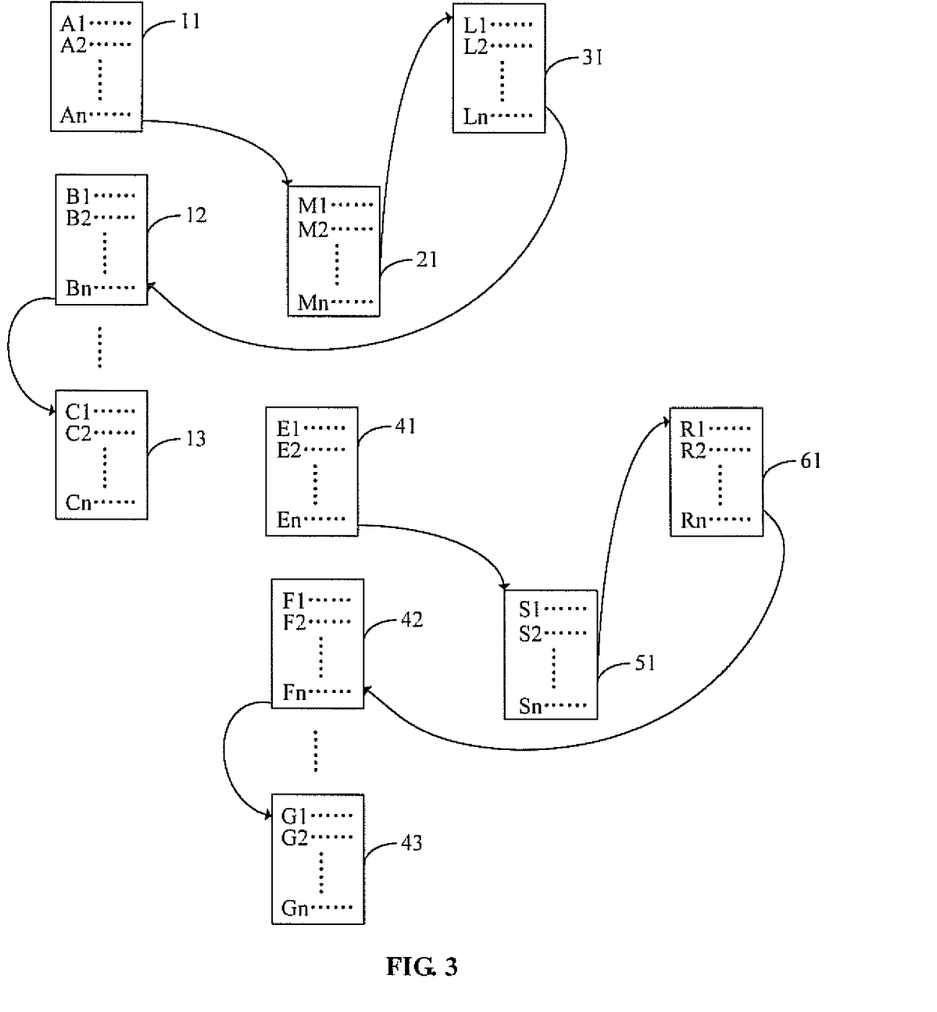
FIG. 3 is a schematic diagram of a calling relation of a code segment according to a specific embodiment of the present disclosure.

FIG. 3 is a schematic diagram of a calling relation of a code segment according to a specific embodiment of the present disclosure. Referring to FIG. 3, FIG. 3 shows a plurality of code segments, which are respectively the code segment 11 composed of the A1~An lines of code, the code segment 12 composed of the B1~Bn lines of code, the code segment 13 composed of the C1~Cn lines of code, the code segment 21 composed of the M1~Mn lines of code, the code segment 31 composed of the L1~Ln lines of code, the code segment 41 composed of the E1~En lines of code, the code segment 42 composed of the F1~Fn lines of code, the code segment 43 composed of the G1~Gn lines of code, the code segment 61 composed of the R1~Rn lines of code, and the code segment 51 composed of the S1~Sn lines of code, wherein the An line of code, the Bn line of code, the Cn line of code, the Mn line of code, the Ln line of code, the En line of code, the Fn line of code, the Gn line of code, the Rn line of code, and the Sn line of code are all calling instructions, and according to the An line of code, the Bn line of code, the Cn line of code, the Mn line of code, the Ln line of code, the En line of code, the Fn line of code, the Gn line of code, the Rn line of code and the Sn line of code, the computer code shown in FIG. 3 is divided into a plurality of code segments, i.e., the code segment 11, the code segment 12, the code segment 13, the code segment 21, the code segment 31, the code segment 41, the code segment 42, the code segment 43, the code segment 51, and the code segment 61. The code segment 11, the code segment 12, the code segment 13, the code segment 21 and the code segment 31 form a group of code segments that are associated with each other, calling relations therebetween can form a sub-data structure; and the code segment 41, the code segment 42, the code segment 43, the code segment 51 and the code segment 61 form another group of code segments that are to associated with each other, calling relation therebetween can form a sub-data structure. In this specific embodiment of the present disclosure shown in FIG. 3, the computer calls the code segment 21 through the An line of code after performing the code segment 11; calls the code segment 31 through the Mn line of code after performing the code segment 21; calls the code segment 12 through the Ln line of code after performing the code segment 31; and calls the code segment 13 through the Bn line of code after performing the code segment 12. The computer calls the code segment 51 through the En line of code after performing the code segment 41; calls the code segment 61 through the Sn line of code after performing the code segment 51; calls the code segment 42 through the Rn line of code after performing the code segment 61; and calls the code segment 43 through the Fn line of code after performing the code segment 42. FIG. 3 schematically shows only several examples of code segments, for the purpose of helping those skilled in the art understand the establishing of the data structure for the calling instruction better.

In the specific embodiment of the present disclosure, the An line of code, the Bn line of code, the Cn line of code, the Mn line of code, the Ln line of code, the En line of code, the Fn line of code, the Gn line of code, the Rn line of code and the Sn line of code are all machine codes, and the calling instruction in assembler language is obtained by performing binary translation on these machine codes.

After step S21, step S22 is performed, in which the code segment initiating the calling instruction and the called code segment are obtained. For example, if the calling instruction obtained in step S21 is the calling instruction represented by the An line of code, then the code segment 11 that initiates this calling instruction and the called code segment 21 are obtained in step S22. If the calling instruction obtained in step S21 is the calling instruction represented by the Mn line of code, then the code segment 21 initiating this calling instruction and the called code segment 31 are obtained in step S22.

Figure 4:
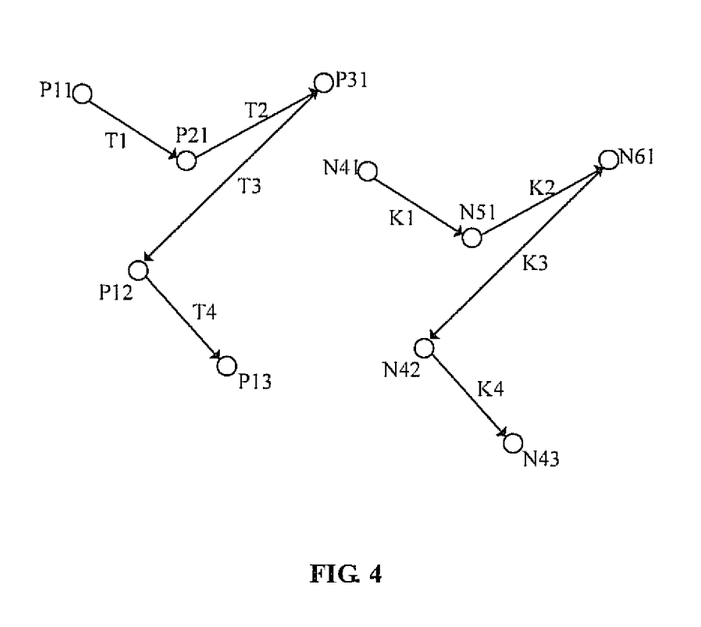
FIG. 4 is a schematic diagram of a code segment calling data structure established in a specific embodiment of the present disclosure.

Step S23 is performed as: establishing nodes by using the obtained code segment initiating the calling instruction and the obtained called code segment. Hereinafter, step S23 will be described in connection with FIGS. 3 and 4, after the code segment 11 is performed, the node P11 is established by using the code segment 11: then the calling instruction represented by the An line of code calls the code segment 21, and after the code segment 21 is performed, the node P21 is established by using the code segment 21: then the calling instruction represented by the Mn line of code calls the code segment 31, and after the code segment 31 is performed, the node P31 is established by using the code segment 31: then the calling instruction represented by the Ln line of code calls the code segment 12, and after the code segment 12 is performed, the node P12 is established by using the code segment 12: then the calling instruction represented by the Bn line of code calls the code segment 13, and after the code segment 13 is performed, the node P13 is established by using the code segment 13. For the other group of code segments, after the code segment 41 is performed, the node N41 is established by using the code segment 41: then the calling instruction represented by the En line of code calls the code segment 51, and after the code segment 51 is performed, the node N51 is established by using the code segment 51: then the calling instruction represented by the Sn line of code calls the code segment 61, and after the code segment 61 is performed, the node N61 is established by using the code segment 61: then the calling instruction represented by the Rn line of code calls the code segment 42, and after the code segment 42 is performed, the node N42 is established by using the code segment 42: then the calling instruction represented by the Fn line of code calls the code segment 43, and after the code segment 43 is performed, the node N43 is established by using the code segment 43.

In step S24, a calling relation between the code segment initiating the calling instruction and the called code segment is established, and the established calling relation is taken as the calling path between the calling node and the called node. Still taking FIG. 3 as an example, the description is given in connection with FIG. 4, the calling path T1 between the node P11 of the code segment 11 and the node P21 of the code segment 21 is established by using the calling relation from the code segment 11 (the initiator of the calling instruction corresponding to the An line of code) to the code segment 21 (the calling object of the calling instruction corresponding to the An line of code, the initiator of the calling instruction corresponding to the Mn line of code), the calling path T2 between the node P21 of the code segment 21 and the node P31 of the code segment 31 is established by using the calling relation from the code segment 21 to the code segment 31, the calling path T3 between the node P31 of the code segment 31 and the node P12 of the code segment 12 is established by using the calling relation from the code segment 31 to the code segment 12, and the calling path T4 between the node P12 of the code segment 12 and the node P13 of the code segment 13 is established by using the calling relation from the code segment 12 to the code segment 13, so that all the calling paths between the nodes from the root node to the current node are established. The calling path K1 between the node N41 of the code segment 41 and the node N51 of the code segment 51 is established by using the calling relation from the code segment 41 (the initiator of the calling instruction corresponding to the En line of code) to the code segment 51 (the calling object of the calling instruction corresponding to the En line of code, and the initiator of the calling instruction corresponding to the Sn line of code), the calling path K2 between the node N51 of the code segment 51 and the node N61 of the code segment 61 is established by using the calling relation from the code segment 51 to the code segment 61, the calling path K3 between the node N61 of the code segment 61 and the node N42 of the code segment 42 is established by using the calling relation from the code segment 61 to the code segment 42, and the calling path K4 between the node N42 of the code segment 42 and the node N43 of the code segment 43 is established by using the calling relation from the code segment 42 to the code segment 43, so that all the calling paths between the nodes from the root node to the current node are established.

In the above calling relations of the two groups of code segments, the calling relations between the code segment 11, the code segment 12, the code segment 13, the code segment 21 and the code segment 31 establish a sub-data structure, which includes the nodes P11, P21, P31, P12 and P13 and the calling paths T1, T2, T3 and T4. The calling relations between the code segment 41, the code segment 42, the code segment 43, the code segment 51 and the code segment 61 establish another sub-data structure, which includes the nodes N41, N51, N61, N42 and N43 and the calling paths K1, K2, K3 and K4. For facilitating the understanding by those skilled in the art, FIG. 3 and FIG. 4 only show an example; the code segment calling data structure in the present disclosure is a data net which includes several sub-data structures, and code segments in each sub-data structure are associated with each other.

In this way, once a code segment is performed, i.e., once a calling instruction is performed, a node is established by using the code segment initiating this calling instruction, so that all the nodes from the root node to the current node can be established, and calling nodes and called nodes are linked by established calling paths.

It is to be noted that the method for establishing a data structure is a dynamic process, once a calling instruction is obtained, the code segment initiating this calling instruction and the code segment to be called are obtained, then nodes are established by using the obtained code segment initiating this calling instruction and the obtained code segment to be called, and the calling path between the calling node and the called node is established by using the calling relation between the code segment initiating this calling instruction and the code segment to be called.

The existing computer is the stack-type computer, the stack area is automatically allocated and released by the compiler, for storing calling parameters of the calling instruction; the calling parameter includes the address of the next code segment to be called by the calling instruction (i.e., the called code segment), and the operation method and operation content of the next code segment, the operation method being how to complete an operation, and the operation content being the object corresponding to the operation. Taking the next code segment of deleting a file as an example, the operation method is deleting, and the operation content is the file.

In the specific embodiment of the present disclosure, the address of the code segment to be called is obtained from the calling parameter, such as the address of the first line of code in the called code segment; by taking FIG. 3 as an example, if the code segment to be called is the code segment 21, then the obtained address of the code segment to be called is the address of the M1 line of code, i.e., the address of the first line of code in the code segment 21; the code segment to be called is obtained based on the address of the code segment to be called, and the code segment in which the calling instruction is located is the code segment that initiates the calling instruction.

The above-mentioned data structure can be used to describe the running status of the computer, and the data structure is a very huge data structure net, in which many data structures are included, with each sub-data structure corresponding to calling relations among associated code segments.

In step S20, a sub-data structure associated with a current operation request is obtained from the data structure, and an initiator, an operation method and an operation object of the current operation request are determined based on the sub-data structure. That is to say, the dynamic and continuous sub-data structure is used to describe the feature of the current operation request, i.e., the feature of the current operation request. The operation request refers to the action of calling the code by the calling instruction; the operation method refers to the attribute of the code segment to be called for the calling instruction, i.e., how to accomplish the operation; and the operation object refers to the object on which the action is performed by the code segment to be called, i.e., the content to be operated. For example, if the current operation request is to call the code segment to delete a file, then the operation method for the current operation request is the action "deleting", and the operation content is the file to be deleted, i.e., the content to be operated on.

In the specific embodiment of the present disclosure, the condition for obtaining a sub-data structure can be preset, and if the current operation request satisfies the preset is condition, the sub-data structure associated with the current operation request is obtained. Therefore, in the specific embodiment of the present disclosure, the obtaining a sub-data structure associated with a current operation request from the data structure includes: presetting a condition for obtaining a sub-data structure; and obtaining a sub-data structure associated with a current operation request, by backtracking the node and the calling path associated with the current operation request based on the data structure, if the current operation request satisfies the preset condition. By taking the example shown in FIG. 3 and FIG. 4 as an example, if the current operation request is the action to be performed by the calling instruction represented by the Bn line of code and the action to be performed by the calling instruction represented by the Fn line of code, then based on the established data structure, for the current operation request corresponding to the Bn line of code, the node and calling path associated with the current operation request are backtracked and obtained, so that the sub-data structure associated with the current operation request is obtained, and the sub-data structure includes the nodes P11, P21, P31 and P12 and the calling paths T1, T2 and T3. For the current operation request corresponding to the Fn line of code, the node and calling path associated with the current operation request are backtracked and obtained, so that the sub-data structure associated with the current operation request is obtained, and the sub-data structure includes the nodes N41, N51, N61 and N42 and the calling paths K1, K2 and K3. By backtracking the node that is prior to the current operation request and associated with the current operation request, until the node that initiates initially the current operation request, the sub-data structure of the current operation request is obtained.

In the specific embodiment of the present disclosure, the current operation request is an assembler instruction, and the codes that run on the computer are all machine codes; the binary translation must be performed on the code that is running on the computer to obtain the current calling instruction, so as to obtain the current operation request; then according to the preset condition, it is determined whether the obtained current operation request satisfies the preset condition, the sub-data structure that is associated with the current operation request is to obtained if the preset condition is met. Specifically, by performing binary translation on the computer code that is running, the machine code is translated into the assembler language, this process is the disassembling process, and after the assembler code is obtained, the calling instruction in the assembler code is obtained, so as to obtain the current operation request; then it is determined whether the obtained current operation request satisfies the preset condition, and the sub-data structure that is associated with the current operation request is obtained if the preset condition is met.

In the specific embodiment of the present disclosure, the computer running space can be divided into at least two sub-spaces; and the preset condition for obtaining sub-data structure is that the operation request in a one sub-space is to call a code segment in another sub-space. Because the computer is operated frequently to call the next code segment (which can be interpreted as the operation request) and the calling of the next code segment by some operation request will have no substance influence on the running of the computer, the computer running space can be divided into at least two sub-spaces, such as 8 sub-spaces, and each sub-space is defined as adjacent to two other sub-spaces, each sub-space can be further divided infinitely as required until it is divided for each operation request, i.e., the validity determination is performed on each operation request. When a certain operation request is to cross the boundary between sub-spaces, the validity verification mechanism for the operation request is triggered, that is to say, when the space for the running of the computer is divided into a plurality of sub-spaces, the condition for obtaining sub-data structure can be set as follows: when the calling instruction in certain sub-space is to call a code segment in another sub-space, the sub-data structure that is associated with the current operation request is obtained.

Then, based on the obtained sub-data structure that is associated with the current operation request, the initiator of the current operation request is determined, and the operation method and operation object of the current operation request are determined. Specifically, based on the obtained sub-data structure that is associated with the current operation request, the obtained sub-data structure that is associated with the current operation request is determined as the initiator of the current operation request. For example, if the current operation request is the action to be performed by the calling instruction represented by the Bn line of code, then the data structure including the nodes P11, P21, P31 and P12 and the calling paths T1, T2 and T3 between the nodes is the sub-state structure that is associated with the current operation request. Based on the calling parameter for the current operation request, the operation method and operation object for the next code segment to be called by the current operation request (the code segment to be called) are determined, i.e., the operation method and operation object of the current operation request.

After the initiator, operation method and operation object of the current operation request are determined, step S30 is performed, in which a rule for normalizing behavior of a computer system is obtained, a matching operation or comparing operation is performed between the determined initiator, operation method and operation object of the current operation request and the rule, so as to determine whether the current operation request is permissible. In the specific embodiment of the present disclosure, the rule for normalizing behavior of a computer system includes three elements which are respectively: an initiator of the operation request, an operation method of the operation request and an operation object of the operation request; the rule for normalizing behavior of a computer system is that: if the initiator of the current operation request satisfies the requirement of the rule, the current operation request is permitted to be performed; alternatively, if the initiator and operation method of the current operation request satisfy the requirement of the rule, the current operation request is permitted to be performed; alternatively, if the initiator and the operation object of the current operation request satisfy the requirement of the rule, the current operation request is permitted to be performed; alternatively, if the initiator, the operation method and the operation object of the current operation request satisfy the requirement of the rule, the current operation request is permitted to be performed. Specifically, there can be four cases, the first case is: determining whether to permit the running of the current operation request according to the initiator of the operation request. The second case is: determining whether to permit the running of the current operation request according to the initiator of the operation request and the operation method of the operation request. The third case is: determining whether to permit the running of the current operation request according to the initiator of the operation request and the operation object of the operation request. The fourth case is: determining whether to permit the running of the current operation request according to the initiator of the operation request, the operation method of the operation request and the operation object of the operation request.

Hereinafter, the method of the present disclosure will be exemplified in connection with the specific example.

The "preset condition for obtaining a sub-data structure" includes: the memory executable code sub-space (by the system code mapping mechanism, the range of the executable code in the system mapping structure is determined, i.e., the memory executable code sub-space), and the structured data sub-space of persisted device (the persisted device is the storage device, and the structured data refers to the data existing in the form of file).

First Example

With the method of the present disclosure, the memory executable code is prevented from being rewritten or recombined:

determining the current operation request by performing the binary translation; and triggering the "malicious" analysis (i.e., triggering the preset condition for obtaining the sub-data structure) if the current operation request is to operate on or manipulate the memory executable code;

obtaining a sub-data structure associated with the current operation request by backtracking nodes and calling paths associated with the current operation request;

according to the obtained sub-data structure of the current operation request, determining the initiator of the current operation request, i.e., all the calling or citing processes for generating the current operation request, i.e. all the nodes and the calling paths that are associated with the current operation request; and taking the sub-data structure of the current operation request obtained from backtracking as the initiator of the current operation request, performing a matching or comparing operation on the initiator and the rule, and deciding whether the current operation request is a remapping initiated by initialization or citing, so as to determine whether to permit the running of the current operation request which is able to rewrite or recombine the executable code, wherein if an impermissible operation takes place, the rewriting and recombining action can be prevented from occurring.

Second Example

By analyzing the initiator of the operation request, the structured data (the data existing in the form of file) of the persistent device (the storage device) is prevented from being destroyed by penetrating:

determining the current operation request by performing the binary translation; and triggering the "malicious" analysis (i.e., triggering the preset condition for obtaining sub-data structure) if the current operation request is to operate on the structured data of the persistent device;

obtaining a sub-data structure associated with the current operation request by backtracking the generating process of the current operation request, i.e., backtracking the node and the calling path associated with the current operation request;

according to the obtained sub-data structure of the current operation request, determining the initiator of the current operation request, i.e., all the calling or citing processes for generating the current operation request, i.e. all the nodes and the calling paths that are associated with the current operation request; and taking the obtained sub-data structure of the current operation request as the initiator of the current operation request, performing a matching operation on the initiator and the rule, and deciding whether to permit the running of the current operation request, wherein the generating process of the writing operation of the structured data is the process of sending downward sequentially in accordance with the stack layer of the stack device of the computer (corresponding to the rule, the initiator of the operation request is the sub-data structure composed of the continuous nodes and calling paths); when the generating process of the current operation request is a non-continuous process (i.e., the calling paths are not continuous), the current operation request is the operation request to penetrate a certain device, the current operation request is an impermissible operation request; the performing or running of the current operation request is not permitted, so that the structured data of the persistent device (the storage device) is prevented from being destroyed by penetrating.

With the present disclosure, when the computer is running, the code segment calling data structure is established, the data structure includes several sub-data structures, with respective nodes in each sub-data structure being associated with each other, that is to say calling relations exist therebetween, and the established data structure is dynamic and is established with the running of the computer, thus the data structure is a dynamic and continuous data structure. After the current operation request is obtained, the sub-data structure that is associated with the current operation request can be obtained by backtracking, forming an effective "evidence link"; the initiator, operation method and operation object of the current operation request are determined according to the sub-data structure (the effective "evidence link"), thus the current operation request is viewed in a dynamic and continuous process instead of an isolated process, so that the comparison between the initiator, operation method and operation object determined by such dynamic and continuous sub-data structure and the rule can be determined, so as to determine whether the current operation request is "good" or "malicious", thereby the behavior of the computer system can be normalized. Moreover, the normalizing behavior of a computer system of the present disclosure is the prevention in advance, not like the prior art which is to fix after the event. When applied in the field of the computer security, the security of the computer system can be ensured, avoiding the fact in the prior art that the "one-size-fits-all" phenomenon is caused in the case that the legitimacy of a certain specific behavior is determined by a certain specific behavior itself, the normal behavior and the behavior that is caused by the malicious code will both be restrained or not restrained, so that the security of the computer system can not be controlled.

Moreover, in the specific embodiment of the present disclosure, the rule for normalizing behavior of a computer system can be that if the initiator of the operation request satisfies the requirement of the rule, the current operation request is permitted to be performed; alternatively, if the initiator and operation method of the operation request satisfy the requirement of the rule, the current operation request is permitted to be performed; alternatively, if the initiator and operation object of the operation request satisfy the requirement of the rule, the current operation request is permitted to be performed; alternatively, if the initiator, operation method and operation object of the operation request satisfy the requirement of the rule, the current operation request is permitted to be performed. The rule for normalizing behavior of a computer system can be determined according to the practical situation, which is very flexible.

The above are only specific embodiments of the present disclosure, for better understanding of the spirit of the present disclosure by those skilled in the art; however, the scope of protection of the present disclosure is not limited by the specific embodiments, modifications can be made to the specific embodiments of the present disclosure by those skilled in the art without deviating from the spirit of the present disclosure, which fall within the scope of protection of the present disclosure.

What is claimed is:

1. A method for normalizing behavior of a computer system, comprising:
    obtaining a calling instruction;
    obtaining, based on the calling instruction, information of a first code segment called by the calling instruction from a non-transitory memory device;
    establishing a code segment calling data structure, where establishing the code segment calling data structure is a dynamic process, wherein a second code segment, where the calling instruction is located, is taken as a node, and a calling relations set up by the calling instruction between the second code segment initiating the calling instruction and the first code segment called by the calling instruction is taken as a calling path, wherein the code segment calling data structure comprises a plurality of sub-data structures, where each of the plurality of sub-data structures comprises a plurality of nodes and a plurality of calling paths, and the plurality of nodes are one-by-one coupled by the plurality of calling paths;
    obtaining a sub-data structure associated with a current operation request from a code segment calling data structure, and determining, based on the sub-data structure, an initiator, an operation method, and an operation object of the current operation request;
    obtaining a rule for normalizing behavior of the computer system, the rule being determinable and adaptable based on a variety of considerations; and
    determining whether the current operation request is permissible by determining if the initiator and at least one of the operation method and the operation object satisfy the rule.

2. The method for normalizing behavior of a computer system according to claim 1, wherein the rule for normalizing behavior of the computer system is that:
    if the initiator of the current operation request satisfies the rule, the current operation request is permitted to be performed;
    wherein, alternatively, if the initiator and the operation method of the current operation request satisfy the rule, the current operation request is permitted to be performed;
    wherein, alternatively, if the initiator and the operation object of the current operation request satisfy the rule, the current operation request is permitted to be performed;
    wherein, alternatively, if the initiator, the operation method and the operation object of the current operation request satisfy the rule, the current operation request is permitted to be performed.

3. The method for normalizing behavior of a computer system according to claim 1, wherein the initiator is a sub-data structure which consists of all of the nodes and calling paths that are prior to and associated with the current operation request.

4. The method for normalizing behavior of a computer system according to claim 1, wherein the operation object is content to be operated by a third code segment to be called for the current operation request.

5. The method for normalizing behavior of a computer system according to claim 1, wherein the operation method is an operation to be performed by a third code segment to be called for the current operation request.

6. The method for normalizing behavior of a computer system according to claim 1, wherein, the step of obtaining the sub-data structure associated with the current operation request from the code segment calling data structure comprises:
   presetting a condition for obtaining the sub-data structure;
   backtracking the node and the calling path associated with the current operation request when the current operation request satisfies the preset condition based on the sub-data structure; and
   obtaining the sub-data structure associated with the current operation request.

7. The method for normalizing behavior of a computer system according to claim 6, further comprising:
   dividing computer running space into at least two sub-spaces,
   wherein the condition for obtaining the sub-data structure is that an operation request in one of the sub-spaces is to call a code segment in another sub-space.

8. The method for normalizing behavior of a computer system according to claim 1, wherein establishing the code segment calling data structure comprises:
   obtaining the calling instructions;
   obtaining both the second code segment initiating the calling instruction and the first code segment to be called;
   establishing the node based on the obtained second code segment initiating the calling instruction and the first code segment to be called; and
   establish the calling relation between the second code segment initiating the calling instruction and the first code segment to be called, the established calling relation being taken as the calling path between the calling nodes and called nodes.

9. The method for normalizing behavior of a computer system according to claim 8, wherein the calling instructions is an assembler instruction, and the step of obtaining the calling instructions comprises:
   performing binary translation on a computer code that is running to obtain the calling instructions.

10. The method for normalizing behavior of a computer system according to claim 8, wherein the step of obtaining the second code segment initiating the calling instruction and the first code segment to be called comprises:
   obtaining addresses of the code segments to be called from calling parameters; and
   obtaining the code segments to be called based on the addresses of the code segments to be called,
   wherein the code segments including the calling instructions are the code segments initiating the calling instructions.

* * * * *